3,063,844
CHEWING GUM BASE
Seitaro Meguro, Miyakojima-ku, Osaka, Toshio Ozawa, Higashinada-ku, Kobe, Tomoo Yasuhara, Miyakojima-ku, Osaka, Shigeru Sukegawa, Suma-ku, Kobe, Tadashi Shiobara, Higashinada-ku, Kobe, and Yasuo Yoshihara, Higashiyodogawa-ku, Osaka, Japan, assignors to Kanegafuchi Spinning Co., Ltd., Tokyo, Japan
No Drawing, Filed May 29, 1961, Ser. No. 113,139
Claims priority, application Japan June 1, 1960
6 Claims. (Cl. 99—135)

This invention relates to chewing gum bases having an internal or permanent plasticity, chewing gums comprising such chewing gum bases and also to their production.

Chewing gum base adapted to be mixed with sugar and/or other sweetening material, flavoring material and other additives for the production of chewing gum generally comprises a mixture of resinous and filler materials. The resinous material is most important constituent because it is generally highly determinative of the properties, particularly chewing characteristics of the final chewing gum.

It has been proposed heretofore to use polyvinyl acetate as a main resinous ingredient in chewing gum base. While polyvinyl acetate is useful as a chewing gum base material owing to its low price, elasticity, insolubility to water, non-toxity, lack of odor and taste, it is not fully satisfactory in view of its various drawbacks. Usually, polyvinyl acetate having a polymerization degree from about 200 to 500, most typically about 345 is employed as a chewing gum base, and as is well known it is absolutely necessary to admix a plasticizing agent such as dibutylphthalate, butylphthalybutyl glycolate, methylacetyl ricinoleate, acetyltributyl citrate and the like with the resin to improve the plasticity and chewing characteristics of the latter. The amount of the plasticizer varies depending upon the particular resin, desired chewing characteristics and temperature (hot, ordinary or cold) where and when the chewing gums are sold, but generally it is employed in an amount from about 13 to about 15% by weight based upon the resin. However, the use of a plasticizer admixed with the resin brings various drawbacks on the final product. Thus, for example, during chewing of the gum the plasticizer as initially evenly distributed in the gum gradually migrates or otherwise dissolves into saliva causing undesired odor and/or taste and/or irritation, if any, of the plasticizer. Furthermore, as the plasticizer migrates into and is conveyed away with the saliva the gum loses its desired characteristics, particularly the desired softness and plasticity when subjected to prolonged chewing. Further drawback of conventional polyvinyl acetate base which requires the ushe of a plasticizer is in that it can not satisfactorily be used together with a fatty or oily tasty material and the like such as milk, chocolate and cocoa, because during chewing of the gum the plasticizer as initially evenly distributed in the gum will migrate or dissolves into the fat or oil (such as cacao oil or cacao butter) and is concentrated therein. The plasticizer concentrated portions when chewed, unduly irritate the mouth or taste bitter or unpleasant. Still further drawback of polyvinyl acetate base chewing gum is that its hardness or stiffness varies sharply depending upon temperature.

It is an object of this invention to overcome all these drawbacks of polyvinyl acetate chewing gum bases by chemically modifying the polyvinyl acetate.

It is also an object of this invention to provide modified polyvinyl acetate type chewing gum bases which do not require the addition of a plasticizer or which require only a very small amount of a plasticizer, said plasticizer causing various drawbacks as mentioned before.

It is another object of this invention to provide a novel chewing gum base which contains a permanent or internally fixed plasticity.

It is a still further object of this invention to provide a novel chewing gum base which is less sensitive to temperature variation as compared with conventional polyvinyl acetate chewing gum bases.

Other objects, features and advantages of this invention will be clear from the following detailed explanation.

We have found that the above mentioned various drawbacks of polyvinyl acetate for use in chewing gum bases can be overcome by chemically modifying the same. More particularly, according to this invention, copolymers of vinyl acetate and 2-ethylhexylacrylate are used and we have found that the copolymers are especially suitable in the manufacture of chewing gum bases because by the use of the copolymers the various drawbacks of the conventional homopolymers of vinyl acetate encountered in the art of chewing gums can be avoided as hereinlater described.

The important significance of the copolymer according to this invention is in the fact that the plasticity imparting component, 2-ethylhexylacrylate is chemically combined with vinyl acetate to form the copolymer and therefore the copolymer has a permanent or inherent internal plasticity. By the word "permanent" we mean that the plasticity of the copolymer is retained without any change for the usual chewing life of chewing gum and even for more than a plurality of hours of chewing.

The plasticity of the copolymer can be varied by varying the ratio of vinyl acetate to 2-ethylhexylacrylate. Generally as the content of the 2-ethylhexylacrylate increases the plasticity of the resulting copolymer increases correspondingly. The ratio of vinyl acetate to 2-ethylhexylacrylate may vary considerably depending upon the properties of the final gum which are desired and also upon the amount and kinds of ingredients to be mixed therewith to produce the final product. However, generally the content of 2-ethylhexylacrylate component in the copolymer may vary from 10 to 35% (weight), preferably 15 to 30% (weight). The polymerization degree of the copolymer as expressed by viscosity ($\eta$sp./c.) is preferable to be from 0.015 to 0.025, when measured at 30° C. with Ostwald viscometer for an acetone solution wherein 4 grams of the copolymer were dissolved in one liter of acetone (c.=4 g./liter of acetone).

The permanently plasticized copolymers may be mixed with conventional ingredients for producing chewing gums in the conventional manner. Thus, for example, the copolymer may be mixed with smoothing material (such as microwax, candelilla wax, carnauba wax, polyisobutylene, etc.), surface active agent, fillers (such as calcium carbonate, talc, etc.), sweetening material (such as sugar, glucose, syrup and the like), flavor and other additives for chewing gums. The amount and kind of these ingredients are well known to those skilled in the art and are suitably selected as desired depending upon the various manufacturs' formulae. In this connection, however, it should be noted that since the copolymer itself has a desired permanent plasticity the addition of a plasticizer (which is absolutely necessary when a homopolymer of vinyl acetate is used and which causes various drawbacks as hereinbefore described) is not required at all or may be minimum even when required, according to the present invention Thus, for example, when a copolymer of vinyl acetate and 2-ethylhexylacrylate containing about 20–30% (by weight) of the latter is employed there is obtained a chewing gum having desired plasticity and chewing characteristics even without adding any plasticizer, while in case of homopolymer (polymerization degree 345) it was necessary to add 13–15% by weight based on the polymer in order to obtain the similar plasticity and chewing characteristics.

The hardness (stiffness) and plasticity of a copolymer of vinyl acetate and 2-ethylhexylacrylate can be controlled as desired by varying the content of the 2-ethylhexylacrylate component in the copolymer. For example, hardness variation of a copolymer depending upon variation of the 2-ethylhexylacrylate (2EHA) content is as follows:

| 2EHA (wt. percent) | 10 | 15 | 17.5 | 20 | 22.5 | 25 | 30 | 35 |
|---|---|---|---|---|---|---|---|---|
| Hardness [1] | 1,200 | 550 | 360 | 216 | 92 | 40 | 16 | 12.5 |

[1] The hardness was determined at 25° C. by measuring with a strain gauge a strain (grams) on a needle of the gauge when the needle has penetrated the copolymer mass at the depth of 2.5 mm.

As mentioned above, conventional polyvinyl acetate chewing gum bases are sharply sensitive in hardness or stiffness to temperature variation. Therefore, it has been conventional to vary the amount of a plasticizer to be incorporated into polyvinyl acetate depending upon, for example, whether the gum is sold in hot season or cold season. In case, however, so far as polyvinyl acetate is employed the amount of the plasticizer should be more than about 13% by weight based upon the polymer because if it is less than about 13% the gum would be hard and not show desired chewing characteristics at mouth temperature.

In contrast thereto, copolymers of vinyl acetate and 2-ethylhexylacrylate of this invention are generally far less sensitive in hardness or stiffness to temperature variation than polyvinyl acetate. For example, hardness variation depending upon temperatures of each of (A) copolymer of 75% (by weight) vinyl acetate and 25% (by weight) 2-ethylhexylacrylate and (B) polyvinyl acetate (polymerization degree 345) added with 15% plasticizer (dibutyl phthalate) is illustrated as follows:

| Temp. (° C.) | 35 | 30 | 25 | 20 | 15 | 10 | 5 |
|---|---|---|---|---|---|---|---|
| Hardness [1]: | | | | | | | |
| (A) | 10 | 31 | 46 | 108 | 280 | 800 | 1,200 |
| (B) | 16 | 29 | 40 | 50 | 170 | 250 | 440 |

[1] The hardness was determined in the manner as mentioned before.

However, it is of course possible to delicately control the hardness and plasticity of the copolymer gum base of this invention by incorporating therein a very small amount of a plasticizer. It has been found that the addition of the plasticizer in an amount less than 5% by weight based upon the copolymer is sufficient in contrast to 13–15% required where polyvinyl acetate is employed.

It will be understood from the above explanation that the copolymer type bases of this invention are far less sensitive to temperature variation, and do not require or only require a considerably less amount of a plasticizer than conventional polyvinyl acetate type bases. The plasticity of the copolymers according to this invention is permanent and can be varied by controlling the amount of 2-ethylhexylacrylate component in the copolymer. Thus the various drawbacks of conventional polyvinyl acetate type chewing gum bases enumerated hereinbefore are overcome by this invention.

A further advantage of the copolymer type chewing gum base of this invention is in the fact that its chewing characteristics are more similar to natural chicles than conventional polyvinyl acetate type chewing gum base, so that when chewing characteristics of natural chicles are desired it can almost be attained by the novel base of this invention without using expensive natural chicles.

Since the copolymer of this invention has desired permanent plasticity and the addition of a plasticizer is not required or the addition of only a very small amount thereof is sufficient, there are obtained various advantages. Thus, for example, there is no noticeable irritative or bitter taste of the plasticizer during chewing of the gum. Furthermore, owing to the permanent plasticity the desired chewing characteristics, particularly the desired softness and plasticity of the gum are not lost even when subjected to prolonged chewing. Further advantage is in that the copolymer bases can be mixed with a fatty or oily flavor such as chocolate and cocoa to produce a gum which does not unduly irritate the mouth and causes bitter taste when chewed.

It is known that vinyl polymers can be permanently plasticized by copolymerizing with alkyl esters of acrylic acids. However, we have formed that for the particular application (chewing gum base) contemplated in this invention copolymers of vinyl acetate and 2-ethylhexylacrylate are most suitable, particularly because it is non-toxic, substantially odorless and is easily obtainable or produced as compared with other similar copolymers.

The permanently plasticized copolymers of this invention may be prepared by any conventional manner which is well known in the art of polymerization of vinyl compounds. The manufacture itself of these copolymers is not a subject of this invention.

Thus, for example, vinyl acetate may be copolymerized with 2-ethylhexylacrylate in a solvent such as ethanol and in the presence of a catalyst such as benzoyl peroxide or azobisisobutylonitrile at a temperature from 60° C. to reflux temperature of the solution. In this case, 2-ethylhexylacrylate in the form of ethanol solution with the catalyst is introduced into the reaction system at a speed corresponding to the reaction speed between vinyl acetate and 2-ethylhexylacrylate to avoid the formation of a homopolymer of 2-ethylhexylacrylate which is more reactive than vinyl acetate. After the reaction the solvent is recovered by distillation. Thereafter the remaining solvent and unreacted monomers are distilled off by steam distillation. The copolymer is washed and dried.

As a specific example of the procedure, a reaction vessel equipped with an agitator, thermometer, condenser and dropping funnel is charged with 70 parts of vinyl acetate, 5 parts of 2-ethylhexylacrylate, 75 parts of ethanol and 0.375 part of benzoyl peroxide. While stirring the mixture is heated to 65° C. After about 10 minutes of induction period at this temperature the reaction starts. Then a solution consisting of 25 parts of 2-ethylhexylacrylate, 25 parts of ethanol and 0.125 part of benzoyl peroxide is dropwise added to the mixture with 2–3 hours. Heating is further continued to maintain the internal temperature from 65 to 70° C. for further about 2 hours, whereupon the polymerization is completed. By continuing the heating the solvent is distilled, and the remaining solvent and unreacted monomers are distilled off by a steam distillation. The polymer is taken out from the reaction vessel and is dried. The polymerization yield is 80–95%. The copolymer thus produced is ready for use.

In order that those skilled in the art may more fully understand the invention, the following examples are given for illustrative purpose only. In these examples, all parts are by weight.

*Example 1*

Five parts of multi-wax (microwax), 8 parts of calcium carbonate and 2 parts of a surface active agent (aliphatic acid ester of glycerine) were added to 85 parts of a copolymer of vinyl acetate and 2-ethylhexylacrylate (75:25). The mixture was heated to 85–95° C. and well blended to obtain 100 parts of a homogeneous composition or chewing gum base. To 30 parts of this composition or base were added 20 parts of chocolate, 40 parts of sugar, 7 parts of glucose, 2 parts of millet-jelly and 1 part of a chocolate flavor and the mixture was well blended. As a result a chocolate chewing gum with satisfactory chewing characteristics and with pleasant taste of chocolate was obtained. During chewing, there was no bitter or irritative taste. The gum did not lose the desired chewing characteristics even when subjected to prolonged chewing.

Another chocolate chewing gum was prepared by the same manner as mentioned above except that a mixture of 82 parts of polyvinyl acetate (polymerization degree 345), 10 parts of dibutylphthalate (plasticizer) and 8 parts of calcium carbonate was used as the base. This chewing gum when chewed was bitter and there was seen a tendency toward harder or tougher chewing resistance within a relatively short period of time (within about 5 minutes) of chewing.

*Example 2*

Eight parts of multi-wax (microwax), 8 parts of calcium carbonate and 4 parts of a surface active agent (aliphatic acid ester of sucrose) were added to 80 parts of a copolymer of vinyl acetate and 2-ethylhexylacrylate (70:30). The mixture was heated to 85–95° C. and well blended to obtain 100 parts of a homogeneous composition or chewing gum base. To 25 parts of this chewing gum base were added 50 parts of sugar, 22 parts of glucose, 2 parts of millet-jelly and 1 part of a flavor (spearmint flavor) and the mixture was well blended. As a result a chewing gum with chewing characteristics similar to natural chicle base chewing gum was obtained. The hardness and toughness of this chewing gum when cooled to 5° C. and first chewed were not noticeably different from those when it is at normal temperature and first chewed, thereby it could be recognized that this chewing gum is not noticeably influenced in hardness and toughness by temperature variation.

In contrast thereto, another chewing gum was prepared by the same manner as just mentioned above except that a mixture of 80 parts of polyvinyl acetate, 12 parts of dibutylphthalate and 8 parts of calcium carbonate was employed as the chewing gum base. This chewing gum when cooled to 5° C. was, when first chewed, harder and brittler than the same chewing gum at normal temperature.

*Example 3*

To 77 parts of a copolymer of vinyl acetate and 2-ethylhexylacrylate (85:15) were added 5 parts of dibutylphthalate (plasticizer) and were further added 7 parts of multi-wax, 8 parts of calcium carbonate and 3 parts of a surface active agent (aliphatic acid ester of sorbitol). The mixture was heated to 85–95° C. and well blended to obtain a homogeneous composition or chewing gum base. To 25 parts of this base were added 45 parts of sugar, 27 parts of glucose, 2 parts of millet-jelly and 1 part of a flavor (peppermint flavor). The mixture was well blended to obtain a homogeneous chewing gum which has soft chewing characteristics which did not noticeably vary even when subjected to prolonged chewing. Furthermore, there was no bitter or irritative taste during a long period of chewing.

In place of the copolymer mentioned above a homopolymer (polymerization degree 345) of vinyl acetate alone was employed, but to obtain a similar chewing softness it was necessary to incorporate 16 parts of dibutylphthalate into 77 parts of the polyvinyl acetate. There was an unpleasant bitter taste during chewing of this gum and there was recognized a tendency toward harder or tougher chewing resistance within a relatively short period of time of chewing (within about 5 minutes).

*Example 4*

Three parts of dibutylphthalate were added to 78 parts of a copolymer of vinyl acetate and 2-ethylhexylacrylate (80:20). To this mixture were further blended 7 parts of multi-wax, 8 parts of calcium carbonate and 4 parts of a surface active agent (aliphatic acid ester of sucrose). The mixture was heated to 85–95° C. and well blended to obtain a homogeneous composition or chewing gum base. To 28 parts of this chewing gum base were added 5 parts of cocoa, 50 parts of sugar, 14 parts of glucose, 2 parts of millet-jelly and 1 part of a cocoa flavor. Thus a cocoa chewing gum with pleasant taste and flavor was obtained.

What we claim is:

1. A chewing gum base consisting essentially of a copolymer of vinyl acetate and 2-ethylhexylacrylate.

2. A chewing gum base consisting essentially of a copolymer of vinyl acetate and 2-ethylhexylacrylate, the content of 2-ethylhexylacrylate being 10 to 35% by weight, preferably 15 to 30% by weight, based upon the copolymer.

3. A chewing gum base as claimed in claim 2 wherein the copolymer has a viscosity ($\eta_{sp./c.}$) from 0.015 to 0.025 when measured at 30° C. as 4 g./liter solution (c=4 gr. of copolymer/liter of acetone).

4. A chewing gum base which contains a copolymer of vinyl acetate and 2-ethylhexylacrlate and a plasticizer in an amount from 0 to 5% by weight based upon the copolymer.

5. Chewing gum base of claim 2 wherein the content of 2-ethylhexylacrylate is 15 to 30% by weight.

6. Chewing gum base of claim 4 wherein the plasticizer is dibutylphthalate.

References Cited in the file of this patent

UNITED STATES PATENTS

| | | |
|---|---|---|
| 2,662,016 | Merz et al. | Dec. 8, 1953 |
| 2,704,753 | Monaghan | Mar. 22, 1955 |
| 2,740,772 | Alfrey | Apr. 3, 1956 |